(12) United States Patent
Rogers

(10) Patent No.: US 7,958,666 B2
(45) Date of Patent: Jun. 14, 2011

(54) DECOY TECHNOLOGY

(75) Inventor: Jay Rogers, Hudson, WI (US)

(73) Assignee: Expedite International, Inc., Hudson, WI (US)

( * ) Notice: Subject to any disclaimer, the term of this patent is extended or adjusted under 35 U.S.C. 154(b) by 489 days.

(21) Appl. No.: 12/148,222

(22) Filed: Apr. 17, 2008

(65) Prior Publication Data

US 2009/0260273 A1 Oct. 22, 2009

(51) Int. Cl.
*A01M 31/06* (2006.01)
(52) U.S. Cl. ........................................ 43/2; 43/3
(58) Field of Classification Search .............. 43/2, 3
See application file for complete search history.

(56) References Cited

U.S. PATENT DOCUMENTS

| | | | | |
|---|---|---|---|---|
| 4,965,953 A * | 10/1990 | McKinney | ............ | 43/2 |
| 5,459,958 A * | 10/1995 | Reinke | ............ | 43/2 |
| 7,082,710 B1 * | 8/2006 | Jorgenson | ............ | 43/2 |
| 7,634,867 B2 * | 12/2009 | Bill | ............ | 43/3 |
| 2005/0160654 A1 * | 7/2005 | Cosciani | ............ | 43/2 |
| 2005/0204604 A1 * | 9/2005 | Noles et al. | ............ | 43/2 |
| 2008/0060249 A1 * | 3/2008 | Stillwell | ............ | 43/2 |
| 2008/0078113 A1 * | 4/2008 | Denny | ............ | 43/2 |
| 2008/0209792 A1 * | 9/2008 | Watlov | ............ | 43/2 |
| 2009/0188148 A1 * | 7/2009 | Orris et al. | ............ | 43/3 |
| 2009/0272020 A1 * | 11/2009 | Bill | ............ | 43/3 |
| 2010/0064569 A1 * | 3/2010 | Wyant | ............ | 43/2 |

OTHER PUBLICATIONS

Western Rivers; Deceptor Rabbit.html, www.western-rivers.com; first publication date unknown; print date Jun. 20, 2008.
Edge by Expedite; Predator Decoy (Fig. 1 embodiment); sale in US before Apr. 17, 2007.

* cited by examiner

*Primary Examiner* — Christopher P Ellis
(74) *Attorney, Agent, or Firm* — Skinner and Associates

(57) ABSTRACT

A motion-type predator decoy for attracting coyotes, wild dogs and other pest or nuisance predators for use in ranching, farming, recreation land management, public safety and sporting fields. The decoy has a support base for placement during use on an environmental surface. The base includes a downwardly disposed surface contact end of a predetermined lateral dimension and an upwardly disposed support end of a predetermined lateral dimension. The decoy also has a driven decoy mechanism connected to the support end of the base. The decoy mechanism includes an actuator and a flexible decoy member. The actuator generates vibrations and the decoy mechanism undergoes random longitudinal, radial and lateral movement components with respect to the base. A method of using the decoy is also disclosed.

19 Claims, 20 Drawing Sheets

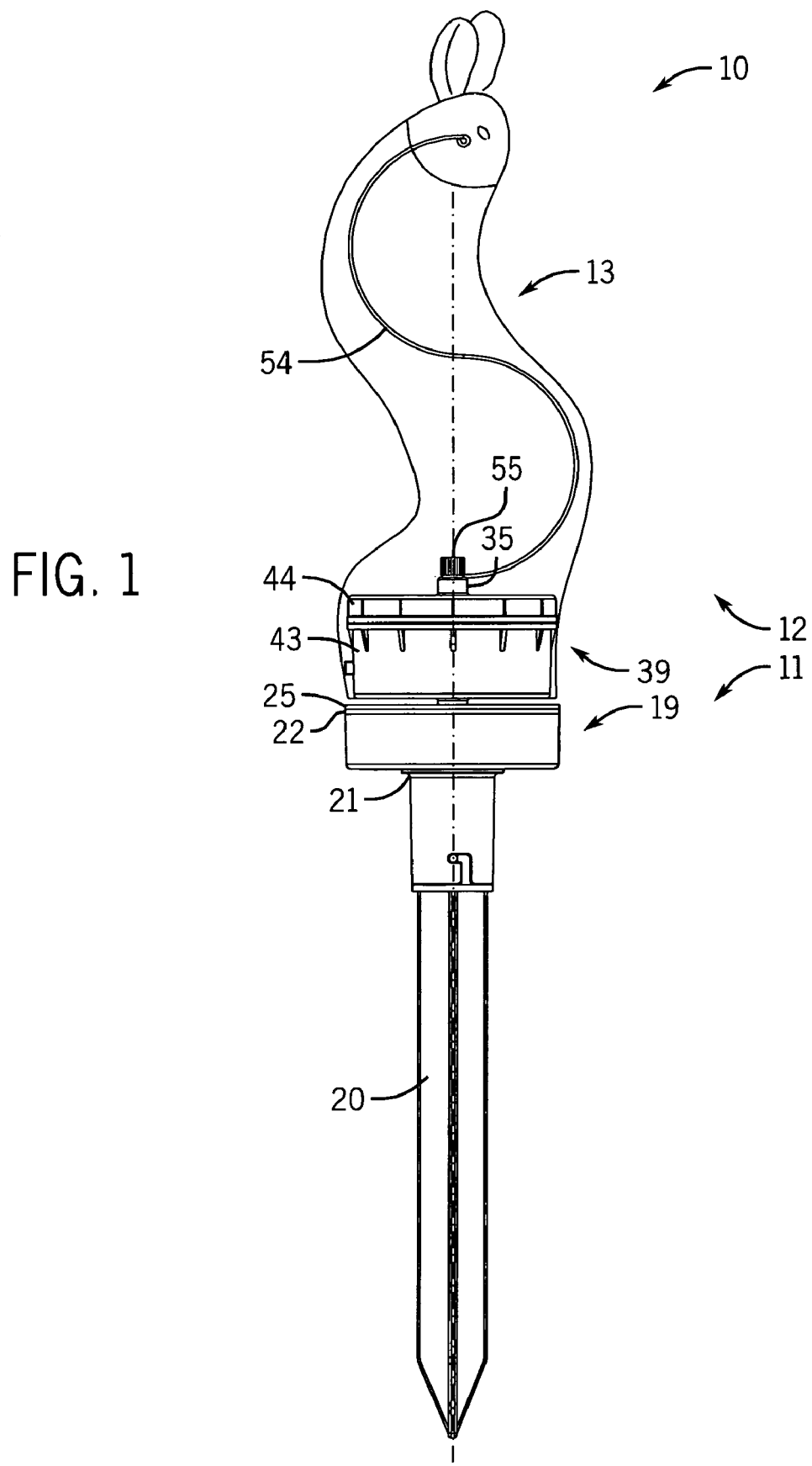

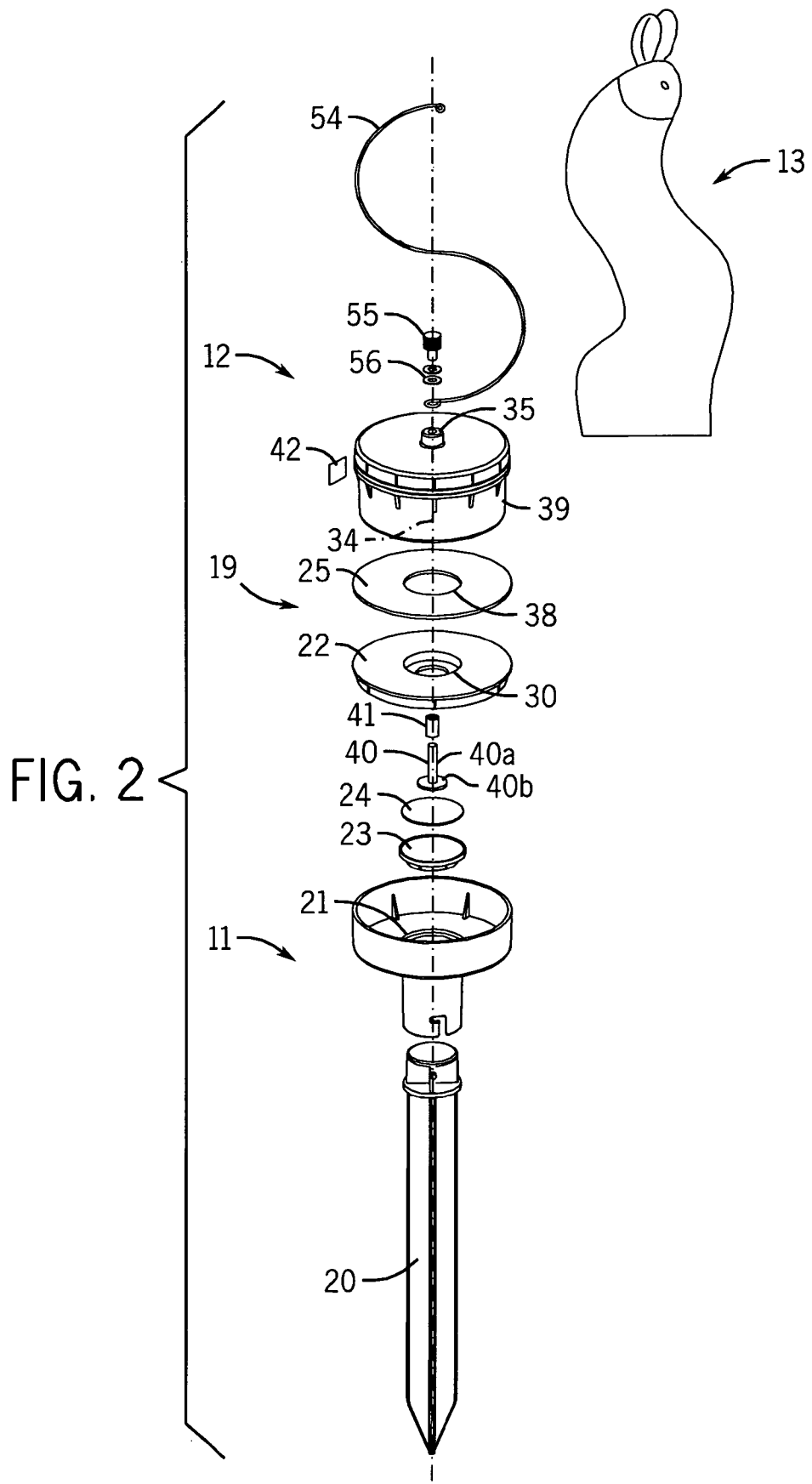

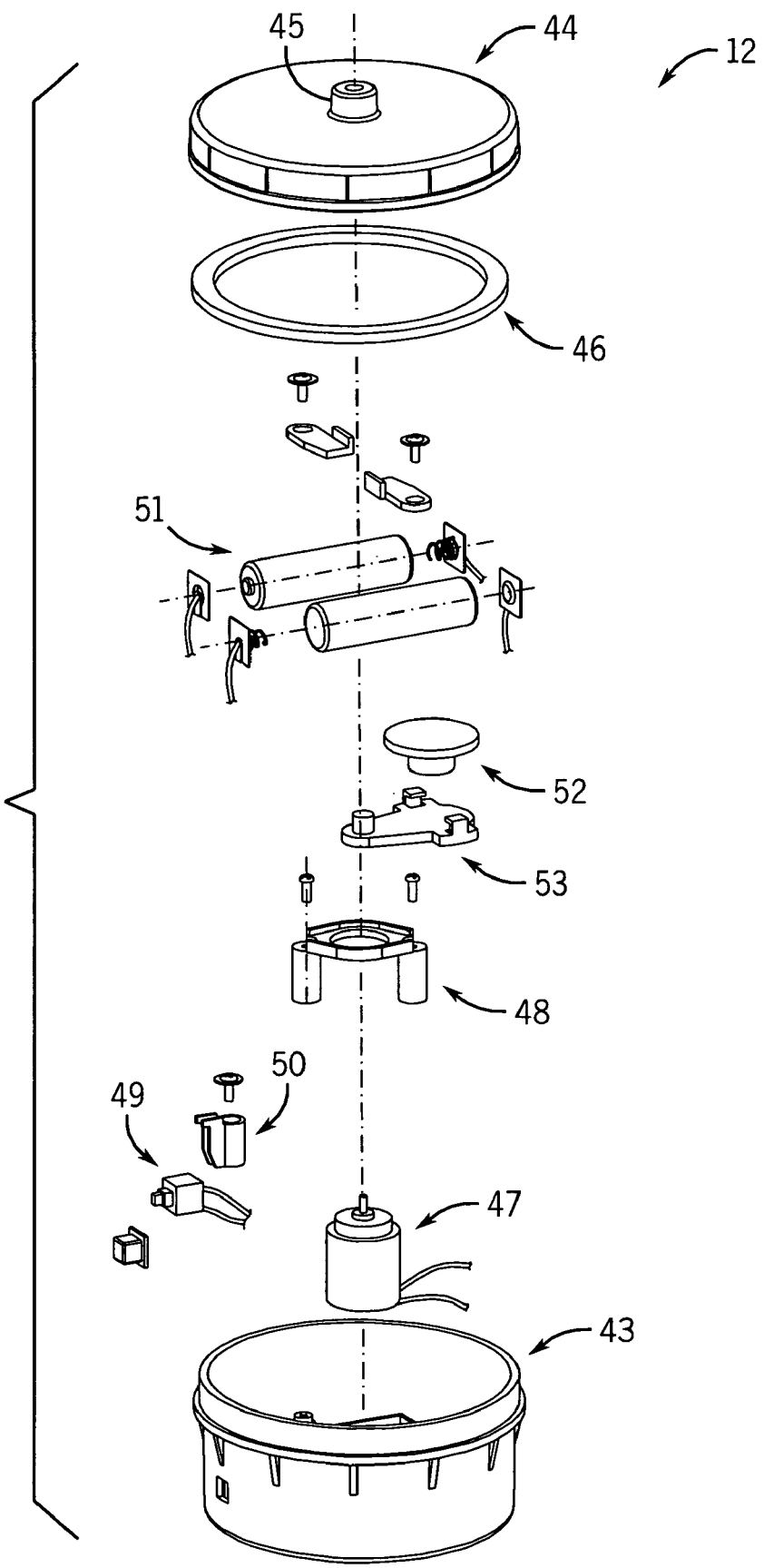

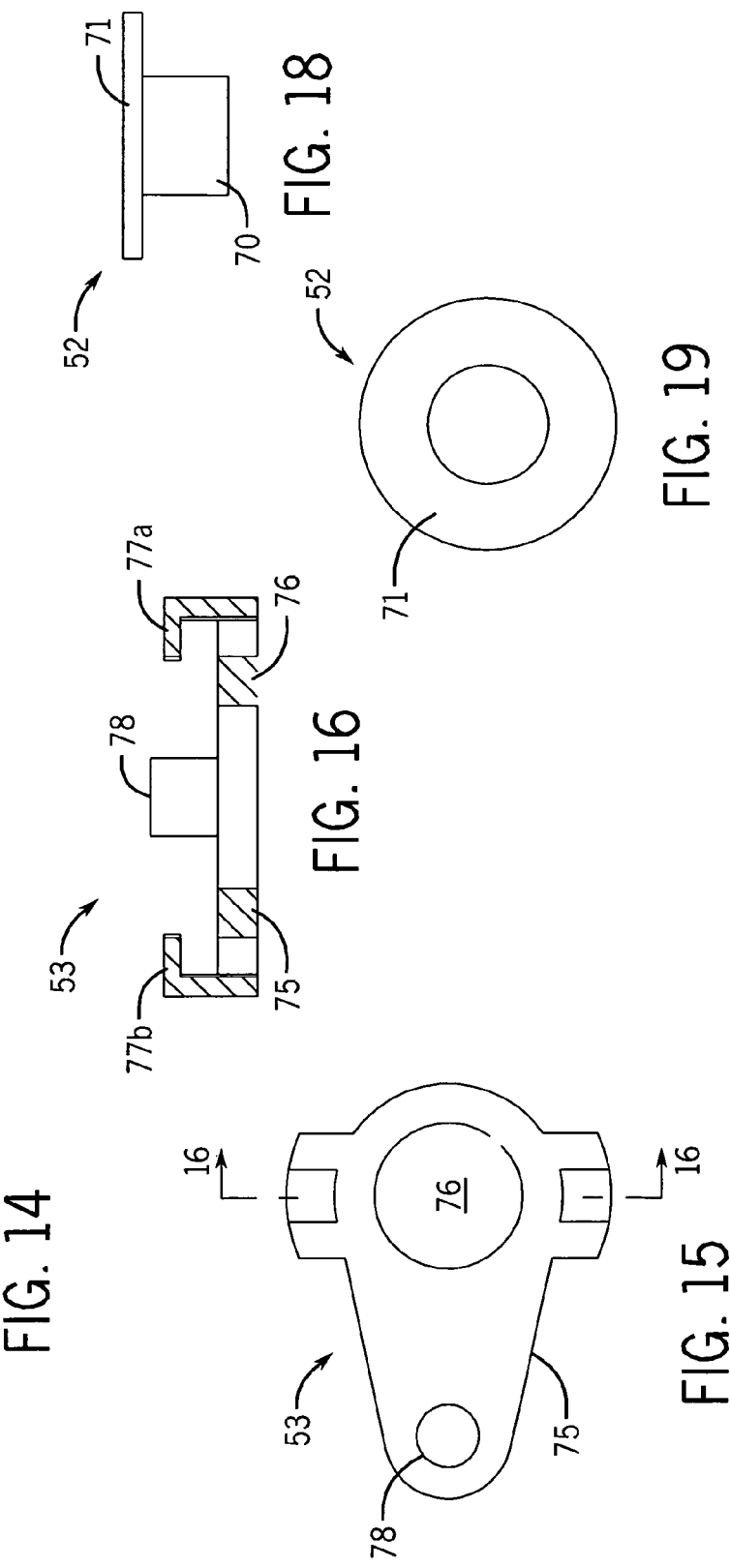

DECOY TECHNOLOGY

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

CROSS-REFERENCE TO RELATED APPLICATIONS, IF ANY

Not applicable

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to decoy systems, apparatus, articles and methods used to attract wild animals. Particularly, the invention relates to a fixed, ground based, motion-type decoy used to attract predator or pest species such as coyotes, wild dogs, and the like. The decoy of the present invention is useful in farming, ranching, aqua-culture, conservation, and parks and recreation, and in the hunting sports as well.

2. Background Information

Wildlife sometimes become a pest, nuisance or even danger to man and other animals and must be controlled via trapping and resettlement, or euthanasia.

Coyotes are an example of wildlife that is posing a problem. Coyotes are an efficient predator which use their keen senses of smell, sight, and hearing to find and kill a wide variety of prey. Food defines coyote habitat, so wherever their food is, coyotes will exist. Originally found only in the Northwest corner of the United States, they have adapted to changes caused by human development, and have now been spotted as far North as Alaska and New England, and as far South as Florida. Their broad range of adaptation also allows them to survive close to man in ranching, agricultural, recreational, residential, and even urban areas. Although coyotes historically have been known to be afraid of human contact, current cases suggest that coyotes are becoming more tolerant of, or even aggressive towards, human contact and humans. Coyotes are one of the few populations of wild animals that seem to be mostly increasing rather than decreasing. Accordingly, a need exists for new and improved means of attracting coyotes and other predators for removal or eradication.

The state of the art, generally, includes various decoys used in attracting waterfowl, mostly for sporting purposes. Motion-type decoys exist.

All US patents and patent applications, and all other published documents mentioned anywhere in this application are incorporated by reference in their entirety.

BRIEF SUMMARY OF THE INVENTION

The invention provides a decoy system, apparatus and methods which are practical, reliable, accurate and efficient, and which are believed to fulfill the need and to constitute an improvement over the background technology.

In a basic aspect, the invention provides an apparatus having a base for placement during use on an environmental surface, the base including a surface contact end of a predetermined dimension and a support end; and a driven decoy mechanism connected to the support end of the base.

In a more particular aspect, the invention provides a decoy apparatus including a support base for placement during use on an environmental surface, the base including a downwardly disposed surface contact end of a predetermined lateral dimension and an upwardly disposed support end of a predetermined lateral dimension which is less than that of the contact end; and a driven decoy mechanism pivotally connected to the support end of the base, the decoy mechanism including an actuator and a decoy member.

In a still more particular aspect, the apparatus is a motion-type predator decoy for attracting coyotes, wild dogs and other pest or nuisance predators for use in ranching, farming, recreation land management, public safety and sporting fields.

The invention also provides methods of making the apparatus of the invention, methods of using the apparatus, and methods of attracting animals, most particularly coyotes, wild dogs and other pest or nuisance predators for use in ranching, farming, recreation land management, public safety and sporting fields.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 1 is a perspective view of an embodiment of the decoy of the present invention.

FIG. 2 is an exploded view of the decoy embodiment of FIG. 1.

FIG. 3 is an exploded view of an embodiment of an actuator used with the decoy.

FIG. 14 is a perspective view of an embodiment of the flywheel arm used in the actuator of the decoy.

FIG. 15 is a top view of the flywheel arm.

FIG. 16 is a crossectional view, taken along line 16-16 of FIG. 15, of the flywheel arm.

FIG. 17 is a perspective view, partially in phantom to show internal and opposite side structure, of an embodiment of the quiver weight used in the actuator of the decoy.

FIG. 18 is a side view of the quiver weight.

FIG. 19 is a top view of the quiver weight.

DETAILED DESCRIPTION

Figure 5:
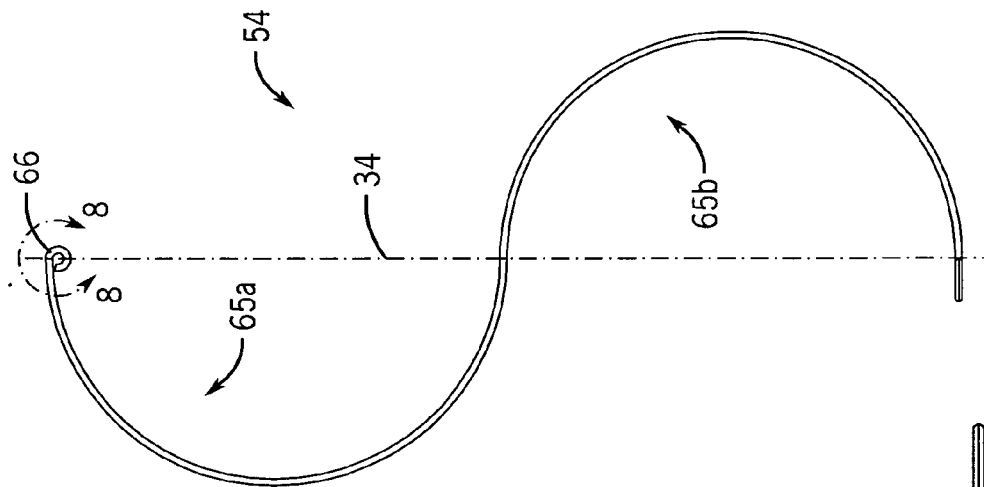
FIG. 5 is a front view of the quiver arm.

The apparatus, articles and methods of the present invention are primary for the purpose of attracting, calling, drawing, summoning, luring or otherwise acquiring animals, particularly dangerous, pest, nuisance predator animals (for example coyotes, wild dogs and the like) for removal or eradication. FIG. 1 is a side or elevation view of an embodiment of the decoy apparatus 10 of the invention. In this embodiment, the decoy 10 comprises, principally, a base 11, an actuator 12, and a decoy member or element 13. In one embodiment of the method of use, the decoy 10 is deployed by a user by attaching the base 11 to the ground or other surface in a predetermined location such as a field, woods, or the like. During attachment, the actuator 12 and the decoy member 13 may be attached to the base 11. Alternatively, the actuator 12 with or without the decoy member 13 may be separated from the base 11. After attachment of the base 11 to the ground, the actuator 12 is connected to the base 11 if it is not already connected. Similarly, the decoy member 13 is connected to the actuator 12 if it is not already so connected. With the actuator 12 and decoy member 13 in place and connected to the base 11, the user then turns on the driving mechanism of the actuator 12. As is described in detail below, the interconnection between the actuator 12 and base 11, in combination with the driving mechanism of the actuator 12, generates a predetermined movement that in turn causes the connected decoy member 13 to undergo a motion that in a preferred embodiment simultaneously has a quivering and shaking motion. The decoy element or member 13 in this embodiment is a flexible cover that is constructed to appear like a small animal, preferably a prey species of the target predator, for example a rabbit, rodent, bird or the like. The outer surface of the decoy element 13 preferably may have a predetermined color, markings and surface area embellishments tied to the prey. Alternatively, the surface may have a generalized small animal color and/or texture. The flexible cove 13 is communicatively connected to the actuator 12. Movement of the decoy 13 by the actuator 12 simulates, generally, the prey in a wounded or otherwise distressed condition. The overall structure, function and motion lures predators to the vicinity of the decoy 10. This permits the user to trap or otherwise capture the animal. Alternatively, the animal may be eradicated by other means permitted by the law of the jurisdiction of use such as killing via bullet, shot, slug, arrow or the like. The decoy 10 may be used alone or in a decoy system in conjunction with other decoys of the same or differing types (static or moving), or in connection with live or inanimate baits or bait material, such as live, dead or artificial animals or animal parts or materials, plants or plant materials, natural or artificial scents, or the like.

Referring also to FIG. 2, a first embodiment of the base 11 is a two (2) part, elongated assembly including, generally, a housing or body 19 and an elongated stake member 20. The housing 19 is releasably connected to the stake 20. The housing comprises a bottom member 21 which connectable to the stake 20, and a top or cover member 22 which is removably coupled to the bottom member 21. These two separable members 21 and 22 enclose and define an internal cavity or space with in the housing 19. The stake member 20 is connectable to the housing 19 and to the environment. This embodiment of the base 11 is now specifically described as follows, beginning from the bottom or group up.

Referring also to FIGS. 10-13, the stake 20 has an elongated, generally cylindrical configuration with a predetermined length, in the example shown, of about 272 cm. and diameter of about 30 cm. Of course, this actual dimension, along with other actual dimensions described herein for the embodiment may be varied consistent with the basic teachings of the invention. The stake 20 is preferably constructed of a light, rigid, moldable plastic material such as Acrylonitrile butadiene styrene (ABS). It is preferably ribbed. The stake member 20 top end 32 is constructed and configured to releasably mate to a complementary connector on the bottom of the housing 19. Top end 32 has a flat surface that may be impacted by the user's hand or a tool such as a hammer or mallet to facilitate insertion into the ground. The bottom end 33 of the stake 20 shaft has a pointed configuration for insertion into non-hardened ground, for example dirt, sand, gravel or the like. The stake 20 is staked into the ground a certain depth depending upon the ground conditions and desired motion. As mentioned above, a first function of the stake 20 is to hold the decoy 10 in place during use. However, another significant function of the stake 20 is to elevate the other members of the decoy 10 a predetermined distance above the ground for maximum visibility to animals to be attracted, and also to optimize its particular motion as described further below. Of course, the stake structure 20 permits removal of the base 11 from the ground for position adjustment, transportation, or storage purposes.

FIGS. 20-24 and 33-36 show a preferred embodiment of the base housing body 19 including the bottom and top members 21 and 22. Turning first to FIGS. 20-24, the body bottom member 21 is releasably connectable to the top end portion of the stake 20. The preferred embodiment of the bottom member 21 has a top portion 26 and a unitary bottom portion 27, and is preferably constructed of a rigid material such as ABS. The bottom portion 27 releasably mates with the top end of the stake 20. The top portion 26 has a cylindrical configuration of a predetermined interior diameter and height. A circular lip 28 is centrally disposed in the interior. Turning next to FIGS. 33-36, the preferred embodiment of the body cover 22 is preferably constructed of a rigid material such as ABS. The body cover 22 is connected to the top of the bottom member 21 and defines the top of the interior space of the housing 19. The body cover 22 has central aperture 30 of a predetermined diameter which is disposed in a coaxial, circular offset member 29. The offset member 29 has a predetermined diameter which is greater than that of the aperture 30, and is inset a predetermined distance with respect to the top of the cover 22. A lip 31 is disposed at the periphery of the cover 22 to mate with the top of the bottom member 27. An interface member 25 is preferably attached to the flat portion of the top of the cover 22. The member 25 preferably has a ring shaped configuration with a predetermined outer diameter equivalent to that of the bottom member 43, and a central aperture 38 of a predetermined diameter and thickness. The interface ring 25 is preferably constructed of a flexible material such as EVA.

Referring again to FIG. 2, the housing 19 interior space has a generally cylindrical configuration which is bounded by the bottom member 21 and the cover member 22. The interior cavity houses an actuator support surface which preferably consists of a bottom cover 23 and a cover top 24. The bottom cover 23 is operably disposed in the housing body 19 and seated in the lip 28 of bottom member 21. It has a disc or plate shaped configuration with a predetermined diameter and substantially flat top surface. The small cover 23 is preferably constructed of a plastic, for example ABS. The cover top 24 is disposed above the bottom cover 23 and also a disc shaped configuration with a predetermined diameter. It also has a substantially flat top surface. The cover top 24 is preferably constructed of ABS.

The preferred embodiment of the actuator 12 is shown FIGS. 1-3. It comprises a motor 47 and power supply 51 operably disposed in a two-part housing 39, and a quiver arm or arm member 54 connected to the top of the housing 49. The actuator 12 is located on top of the housing 19 of the base 11, so that in operation it is disposed a predetermined distance above the ground. As is best shown in FIG. 2, an interface ring 25 is preferably disposed between the base housing 19 and the actuator housing 39. The arm member 54 extends a predetermined distance upwardly from the housing 39 to operably support the decoy member 13.

Figure 26:
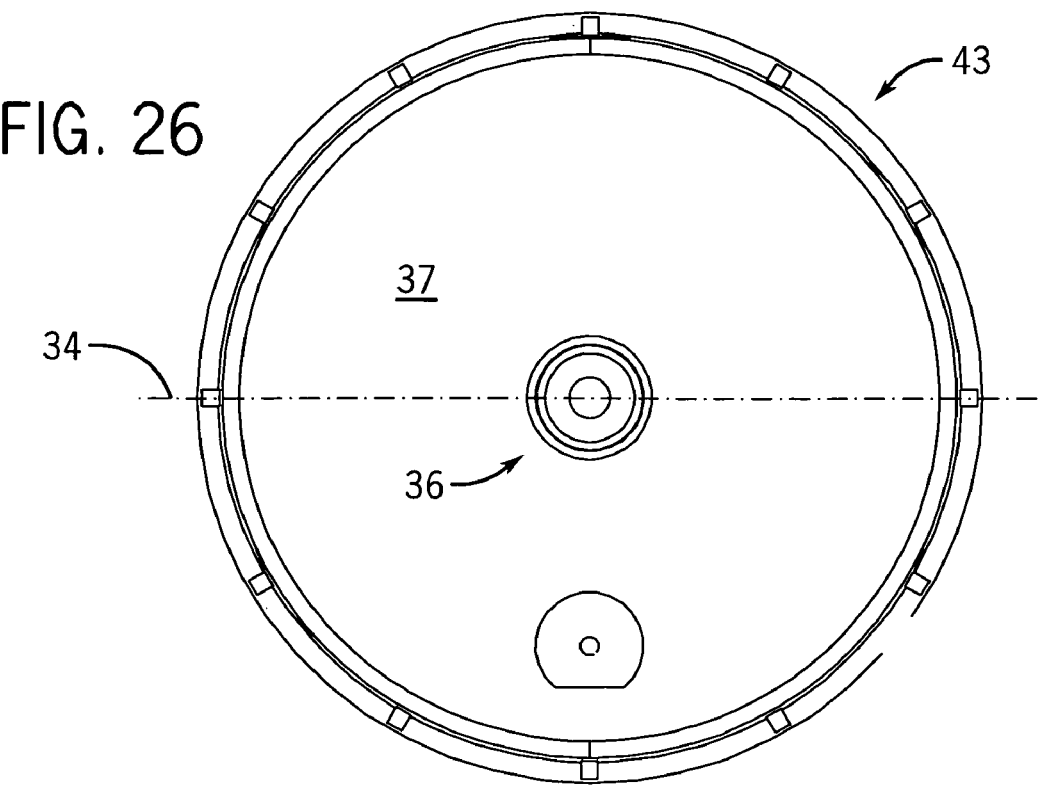
FIG. 26 is a bottom view of the housing bottom.
Figure 27:
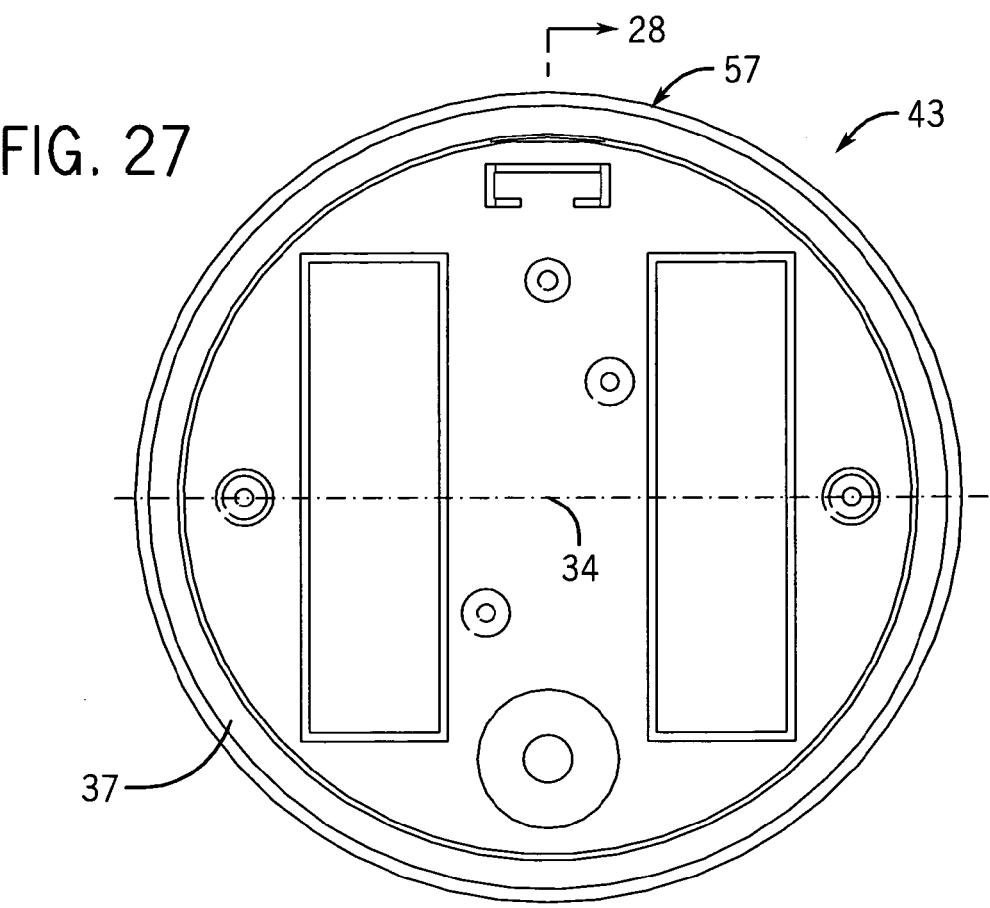
FIG. 27 is a top view of the housing bottom.
Figure 28:
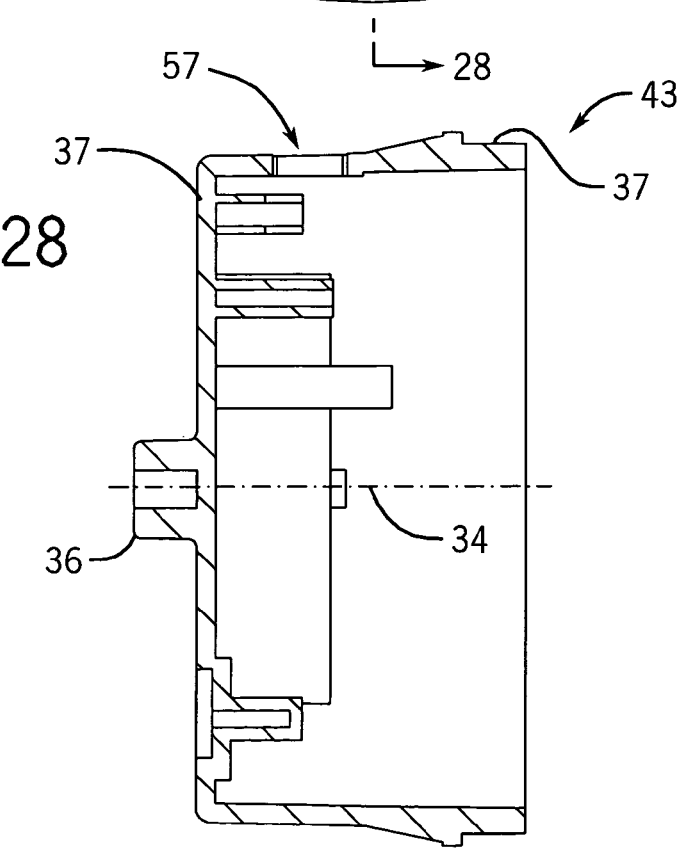
FIG. 28 is a crossectional view, taken along line 28-28 of FIG. 27, of the housing bottom.
Figure 29:
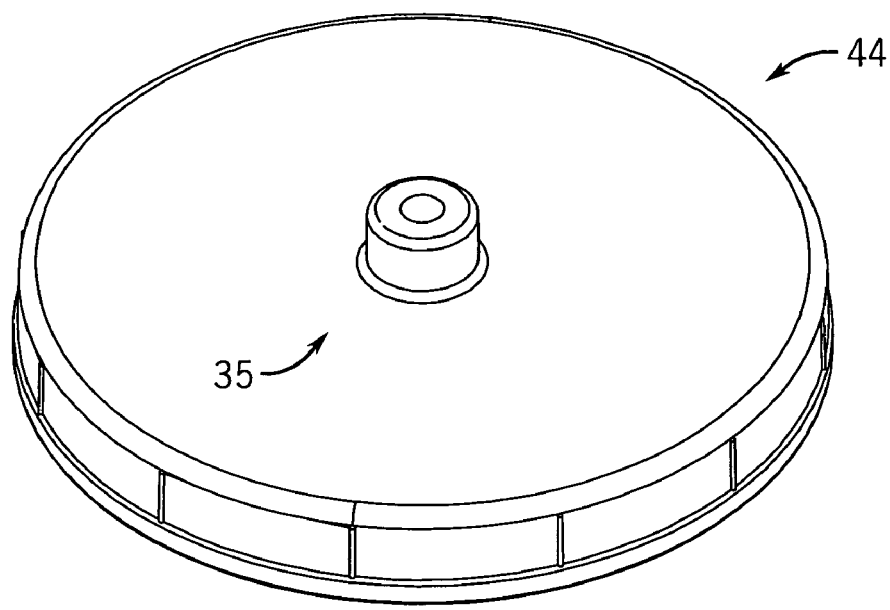
FIG. 29 is a perspective view of an embodiment of the housing top of the decoy.
Figure 30:
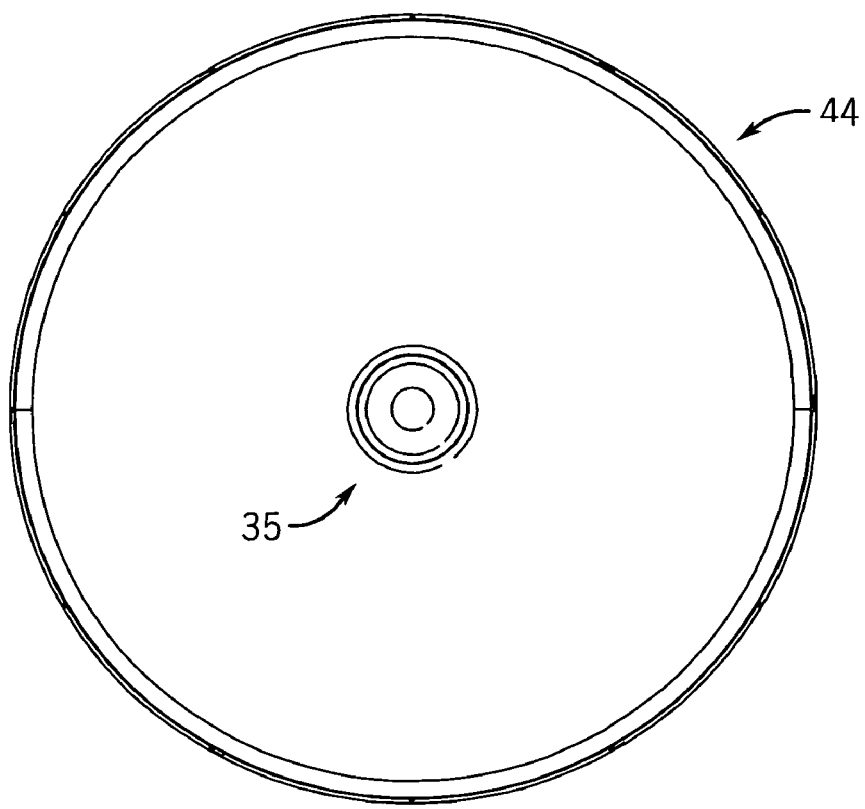
FIG. 30 is a bottom view of the housing top.
Figures 31, 32:
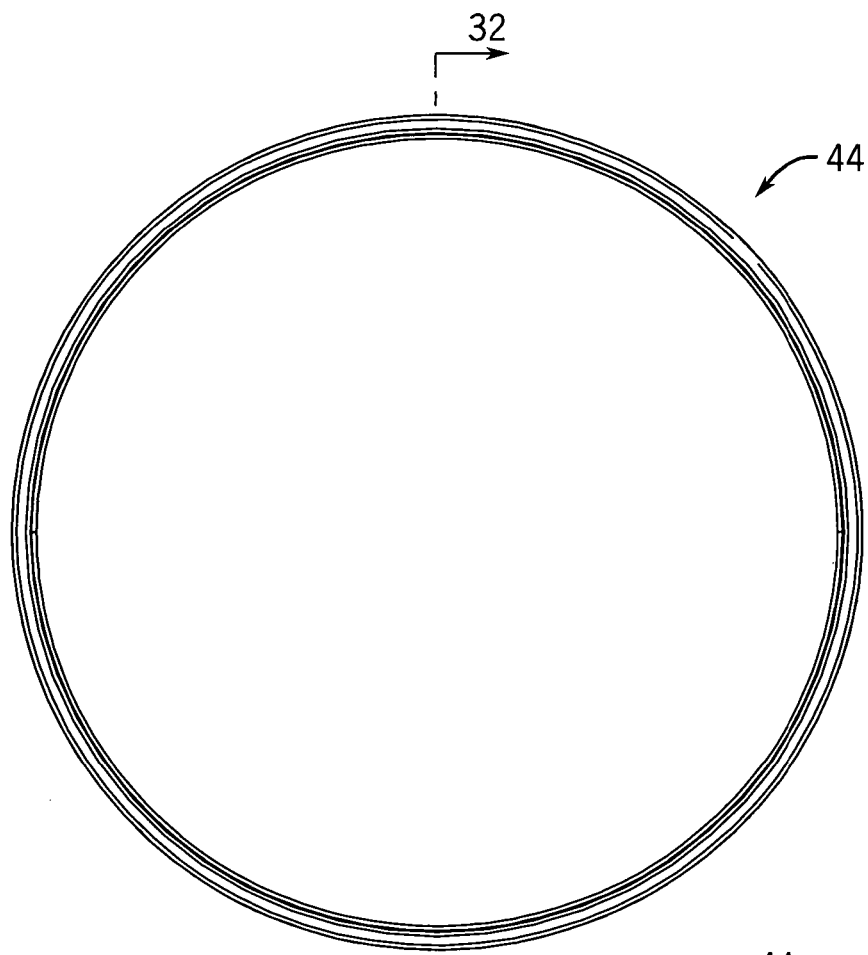
FIG. 31 is a top view of the housing top.
FIG. 32 is a crossectional view, taken along line 32-32 of FIG. 31, of the housing top.
Figure 33:
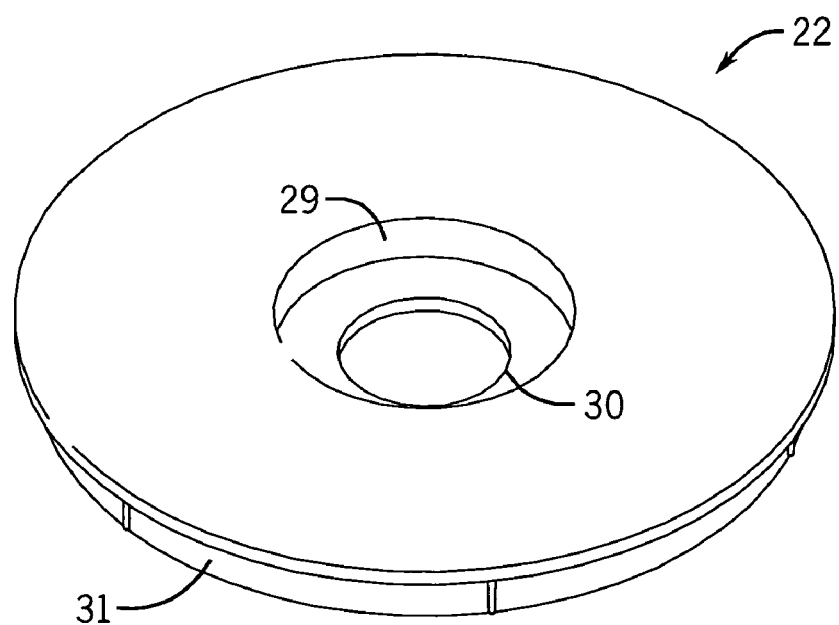
FIG. 33 is a perspective view of an embodiment of the body cover of the decoy.
Figure 34:
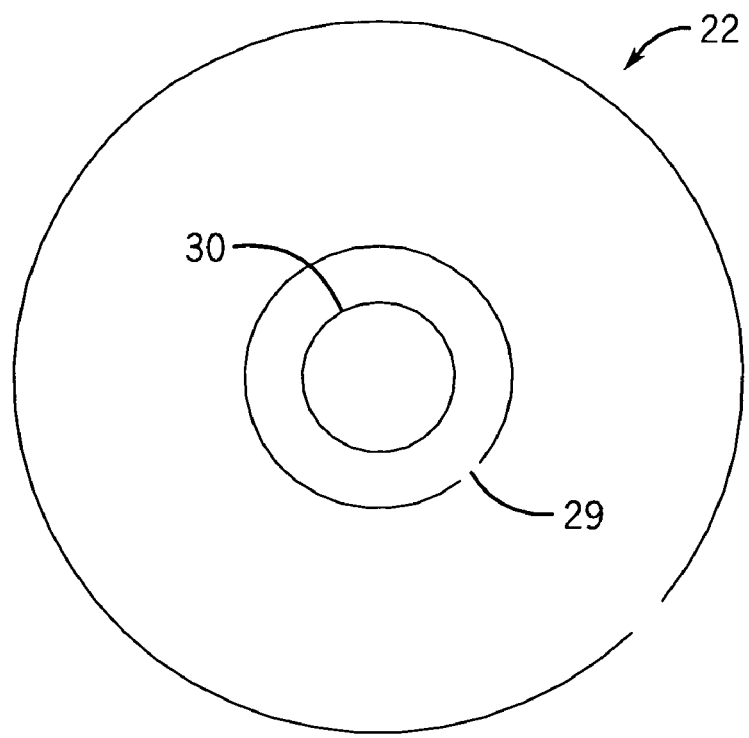
FIG. 34 is a bottom view of the body cover.
Figure 35:
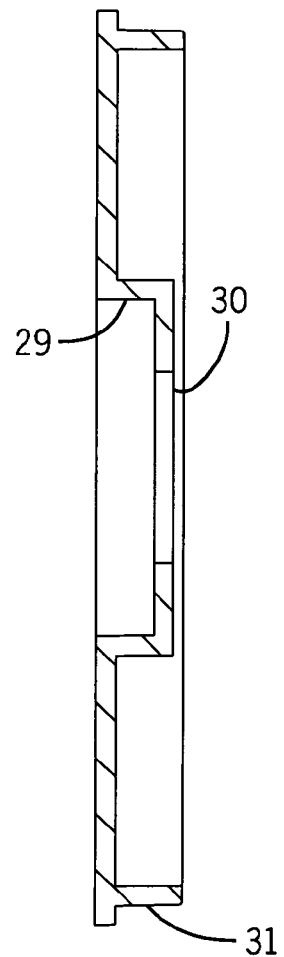
FIG. 35 is a top view of the body cover.
Figure 36:
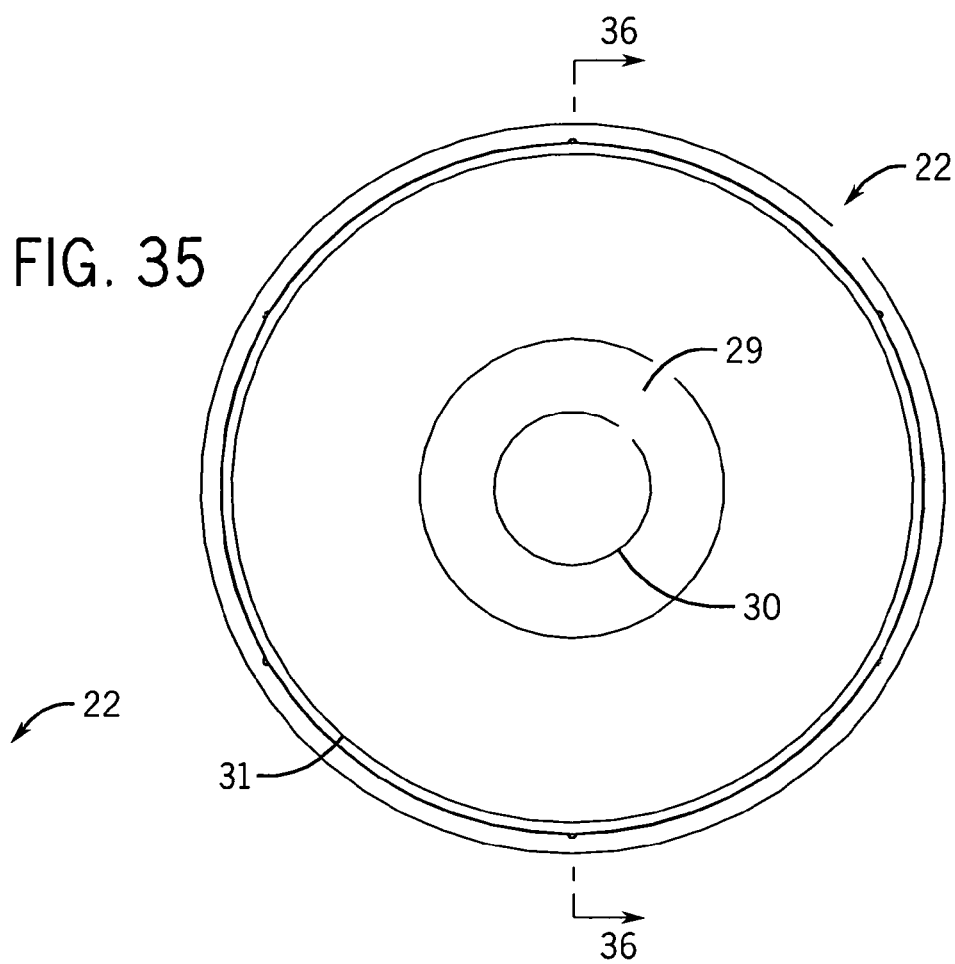
FIG. 36 is a crossectional view, taken along line 36-36 of FIG. 35, of the housing cover.
Figure 37:
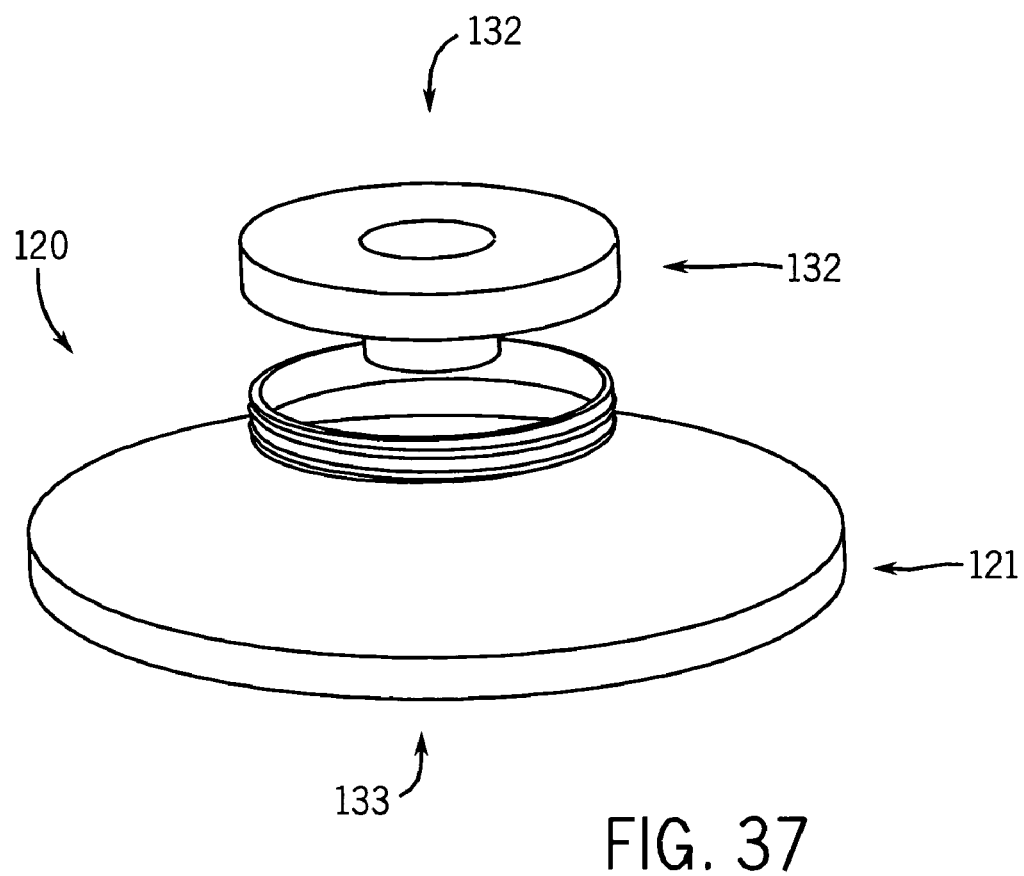
FIG. 37 is an exploded view of an embodiment of a platform of the invention.
Figure 38:
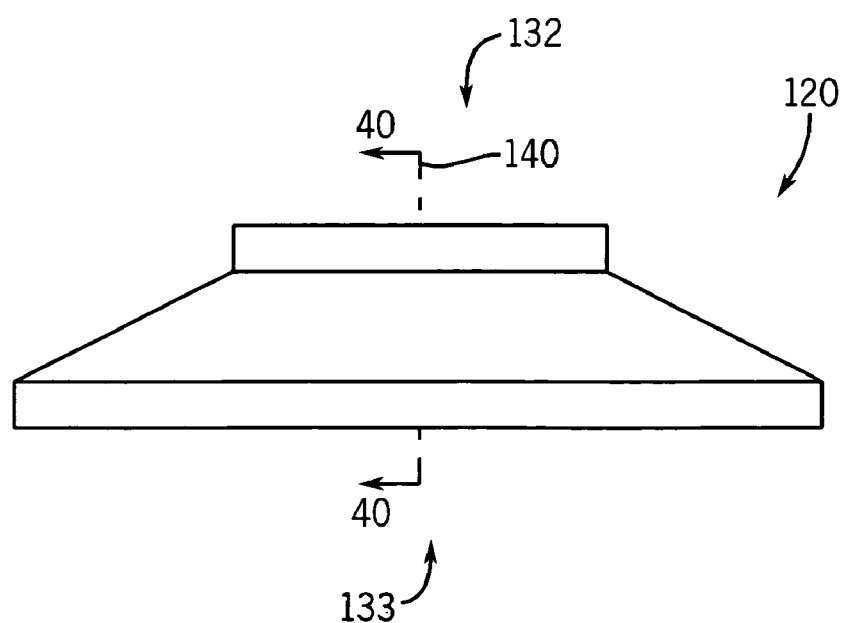
FIG. 38 is a side, elevation view of the platform.
Figure 39:
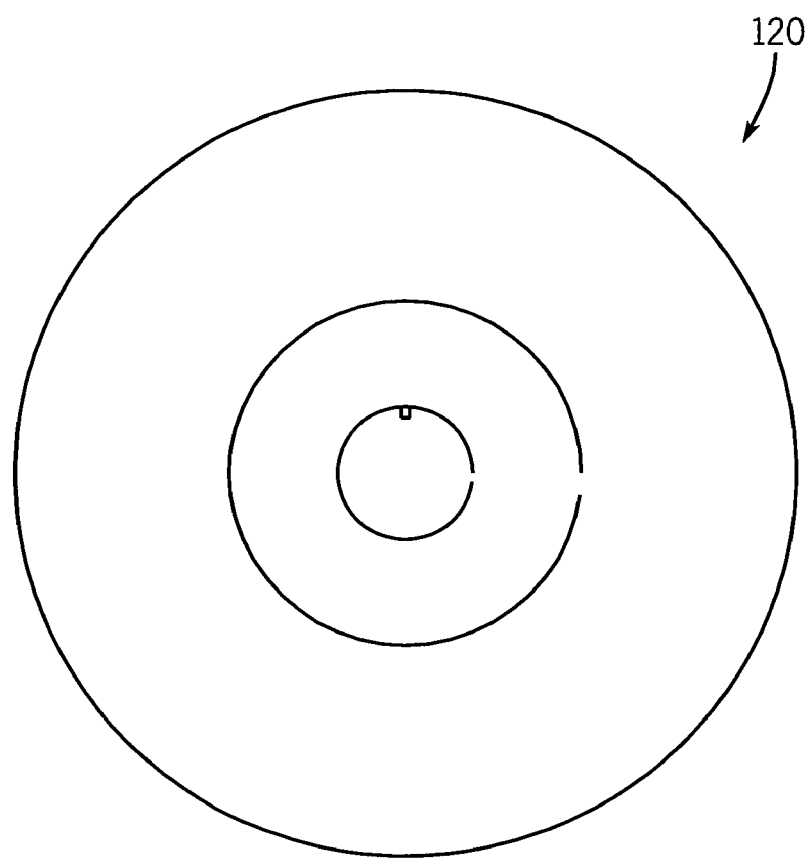
FIG. 39 is a top, plan view of the platform.
Figure 40:
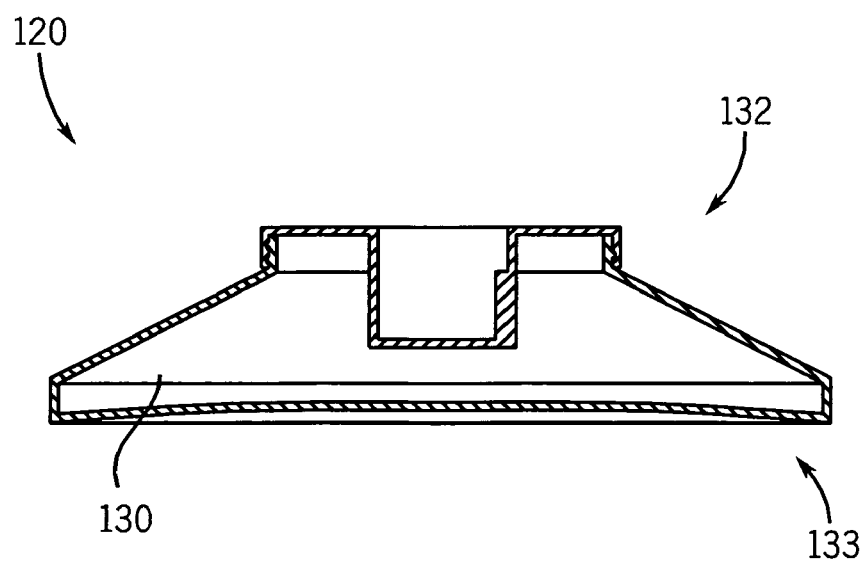
FIG. 40 is a crossectional view of the platform, taken along line 40-40 of FIG. 38.

FIGS. 25-28 and 29-32 show an embodiment of the actuator 12 housing or body 39 which is generally cylindrically shaped and is oriented with respect to actuator longitudinal center axis 34. The housing 39 preferably is a 2 part format with bottom and top members 43 and 44. The bottom member 43 is operably disposed over the top of-the base 11. Referring to FIGS. 26-28, the housing bottom member 43 is preferably constructed of a rigid plastic material such as ABS. The bottom member 43 has a cylindrical configuration of a predetermined interior diameter and height. Interiorly, the bottom surface of the bottom member 43 is preferably configured and arranged, as shown for example, to securely hold the drive assembly components of the actuator 12. Exteriorly, the bottom member has a substantially flat bottom surface 37. A quiver mating structure extends downwardly from the center of the bottom surface 37. This structure preferably consists of a flange 36 is disposed in the center of the bottom surface 37, an actuator support post 40, and a sleeve 41. The support post 40 consists of a screw 40a of a predetermined length and diameter which is screwed into the flange 36 and extends downwardly therefrom to a washer set 40b. The extension distance is adjustable via screw actuation The sleeve 41 is flexible and disposed around the shaft of the screw 40a. The washer set 40b comprises at least one washer of a predetermined diameter which is less than that of the base cover top 24. The support 40 extends through the base cover aperture 30 and interface aperture 38, to contact and movably rides on the cover top 24 which is disposed within the base 11 housing 19.

Figure 4:
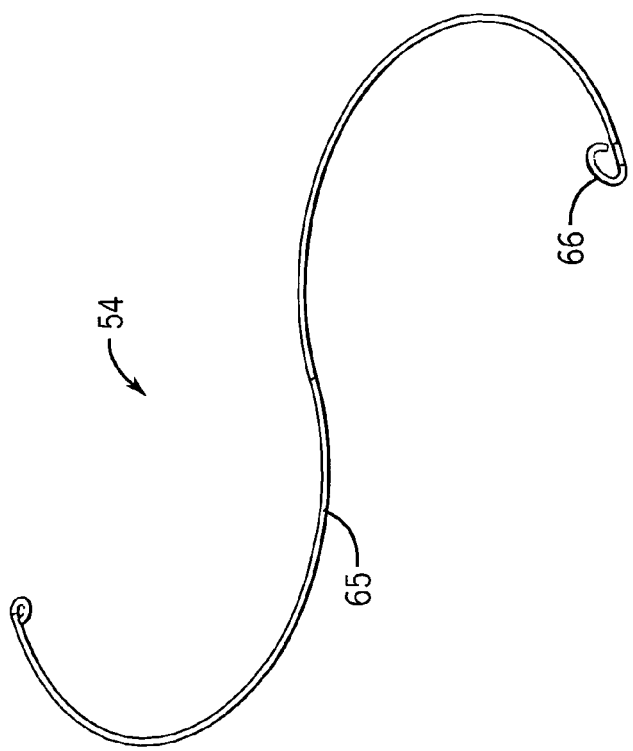
FIG. 4 is a perspective view of an embodiment of quiver arm used with the decoy.

Exteriorly, the top peripheral edge of the bottom member 43 has a connection lip 37 for mating with the top member 44. Turning next to FIGS. 29-32, the top member 44 is preferably constructed of a rigid material such as ABS. When operatively connected to the bottom member 43, the top member or cover 44 defines the top of the interior space of the housing 39. It has bottom circumferential area with a complementary mating configuration for connection to the top lip 37 of the bottom member 43 in an overlapping manner. A sealing gasket 46 assist in sealing the housing 39 from dirt, moisture and other contaminants. The cover 44 has central exterior flange 35 which functions as a support base for the upwardly extending quiver arm 54 of the actuator 13. Referring also to FIGS. 1, 2, and 4, the proximal, bottom end of the quiver arm 54 has a base loop 66 which is disposed on the top surface of the flange 35. A washer set 44 is disposed on top of the base loop 66 and a connector 55 is fixedly inserted into the flange 35 to connect the arm 54 to the housing 39.

Referring again to FIG. 3, the actuator housing 39 interior space has a generally cylindrical configuration, with respect to longitudinal center axis 34, which is bounded by the bottom member 43 and the cover member 44. The space houses the drive assembly of the actuator 12. In this embodiment, the drive assembly components comprise, in a basic configuration, a power supply 51, a motor 47, preferably electric, firmly and fixedly connected to the housing 39 and adapted for electrical connection to the power supply 51, and a control switch 47 for selectively connecting the power supply 51 with the motor 47 in a simple on/off relationship for example. In the preferred embodiment, the motor 47 drive shaft extends vertically into the housing 39 interior. A fly wheel 52 is connected to the motor 47 in a manner such that, during operation, the spinning fly wheel 52 causes the housing 39 to undergo a predetermined quivering motion. The power supply 51 is preferably battery based, for example 2 AA type batteries for supplying approximately on the order of 3 volts power. The batteries are securely held in place by holders integrated into the housing 39 to resist movement during quiver. The switch 49 is firmly held in place near a weather seal aperture by a switch holder 50. The motor 51 is firmly and fixedly held in a predetermined area of the housing 39 by a motor mount 48. Preferably, the motor 51 is disposed off-center with respect to the cylindrical body 39. The motor mount 48 is connected directly to the housing body 39 bottom. Referring also to FIGS. 17-19, the fly wheel 52 has a predetermined mass and configuration including a cylindrical bottom post portion 70 and a disc shaped top portion 71. The fly wheel is connected to the motor 51 via an arm 53. Referring also to FIGS. 14-16, the fly wheel arm 53 has a body 75 with a fly wheel connection aperture 76 disposed at one end and a drive shaft connection post 78 at an opposite end. A pair of clips 77a and b are arranged near the aperture 76 to engage the top disc 71 as the bottom post 70 is disposed through the aperture 76. The dimensions of the arm 53 permit spinning movement of the fly wheel 52 in the housing 39 interior to generate a vibrating motion in the actuator 12. This in turn causes the actuator 13 to undergo a quivering motion with respect to the substantially stationary base 11. Such motion is generated by the central support 40 moving in combination and randomly side to side, up and down, and pivotally over and on the riding surface 24 of the base 11.

Figure 6:
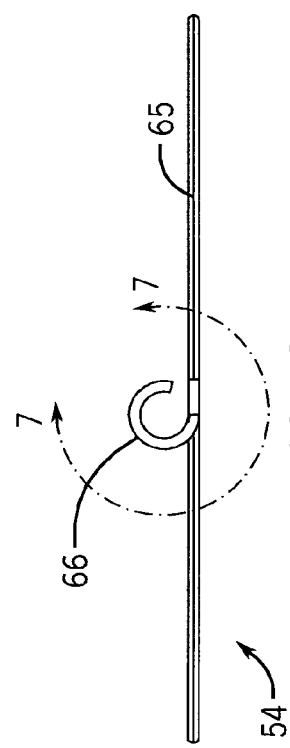
FIG. 6 is an end view of the quiver arm.
Figure 7:
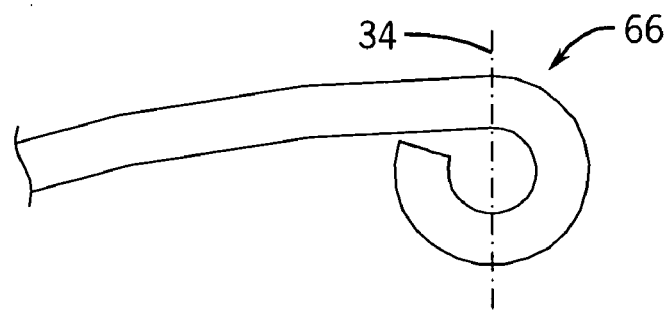
FIG. 7 is a detailed view of a portion, "7" of FIG. 6, of the quiver arm.
Figure 8:
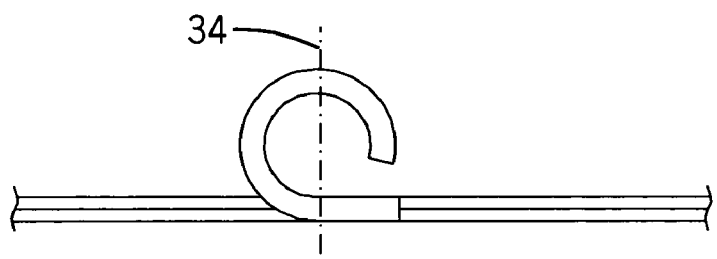
FIG. 8 is a detailed view of a portion, "8" of FIG. 5, of the quiver arm.
Figure 9:
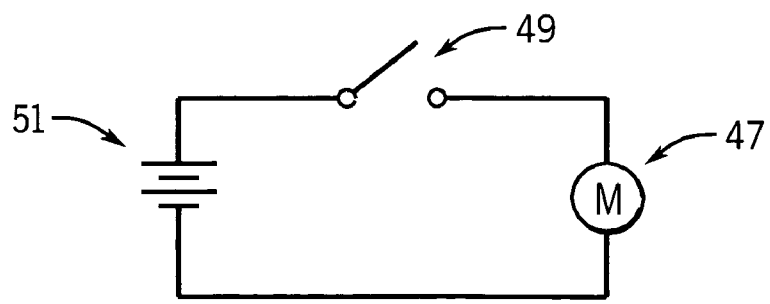
FIG. 9 is a schematic diagram of an embodiment of the electrical power and control system of the decoy.
Figure 12:
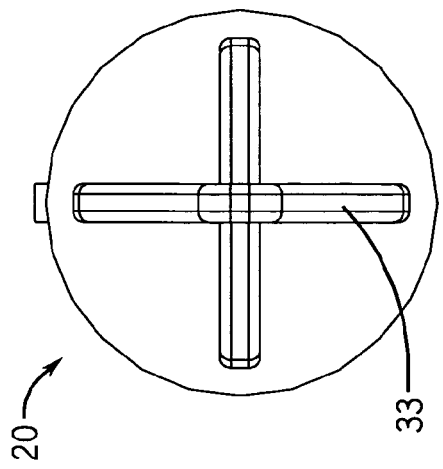
FIG. 12 is an end view of the stake.
Figure 13:
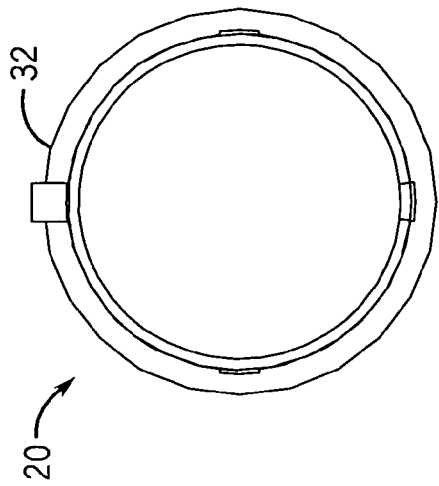
FIG. 13 is an opposite end view of the stake.
Figure 10:
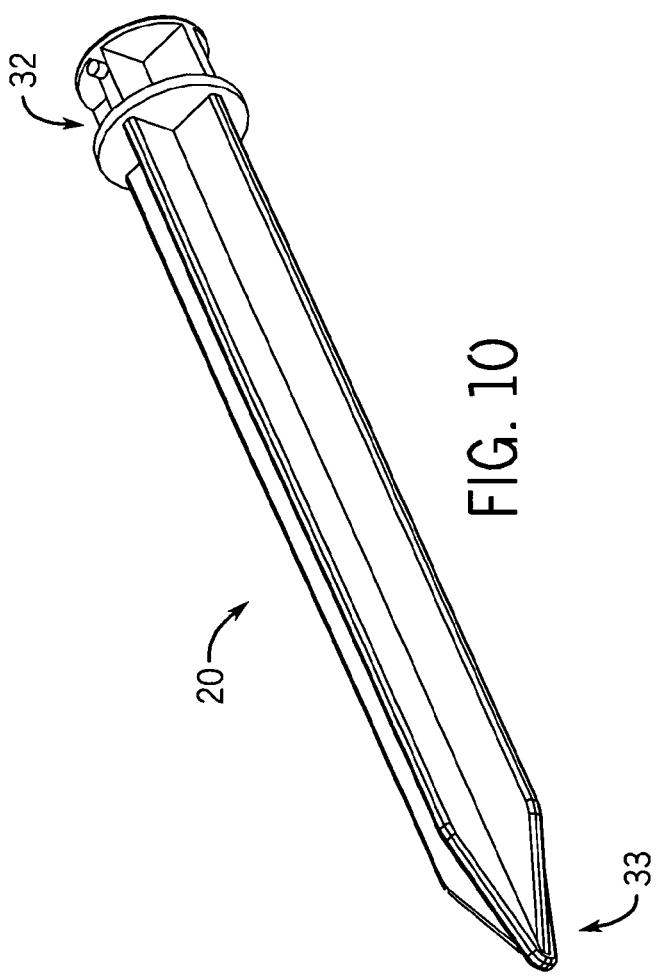
FIG. 10 is a perspective view of an embodiment of the stake used with the decoy.
Figure 11:
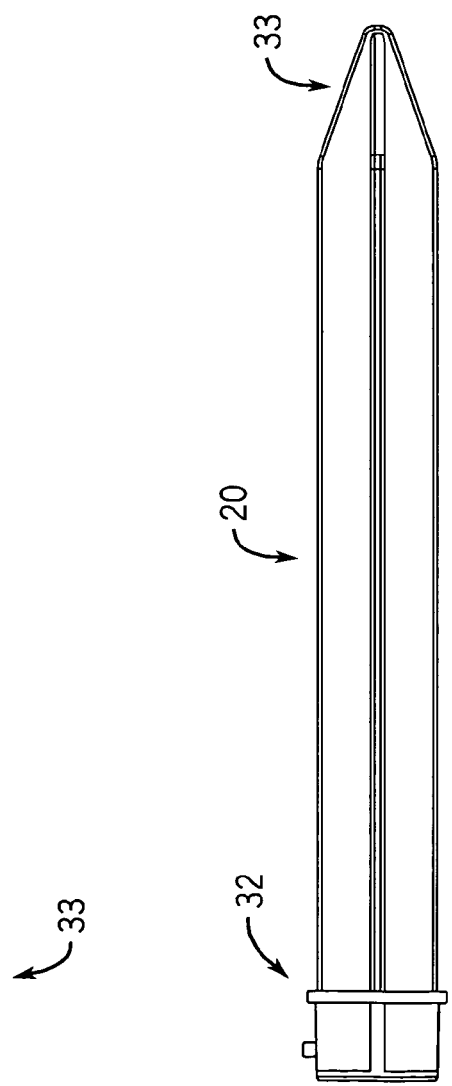
FIG. 11 is a side view of the stake.
Figure 20:
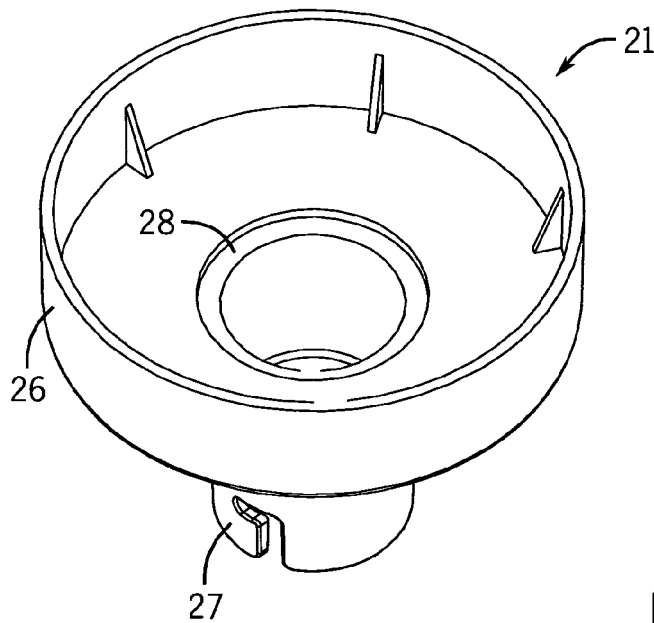
FIG. 20 is a perspective view of an embodiment of the body bottom used in the stake of the decoy.
Figure 22:
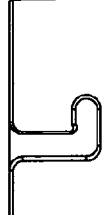
FIG. 22 is a top view of the body bottom.
Figure 21:
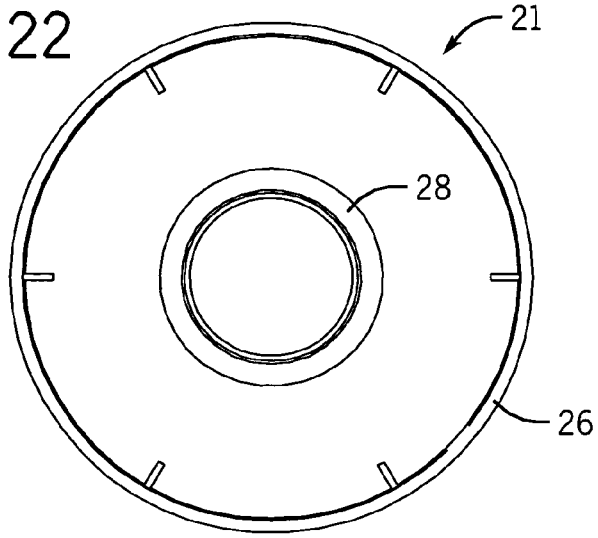
FIG. 21 is a side view of the body bottom.
Figure 23:
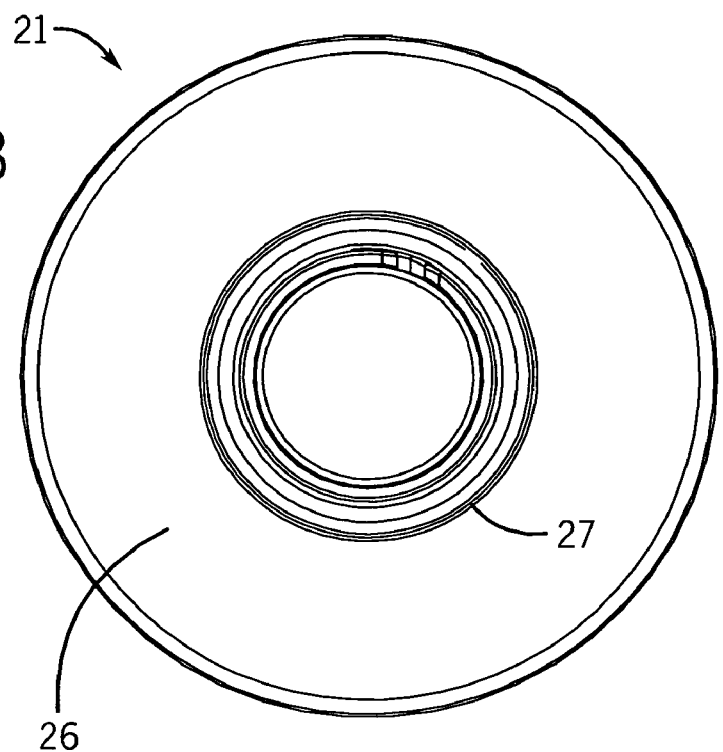
FIG. 23 is a bottom view of the body bottom.
Figure 24:
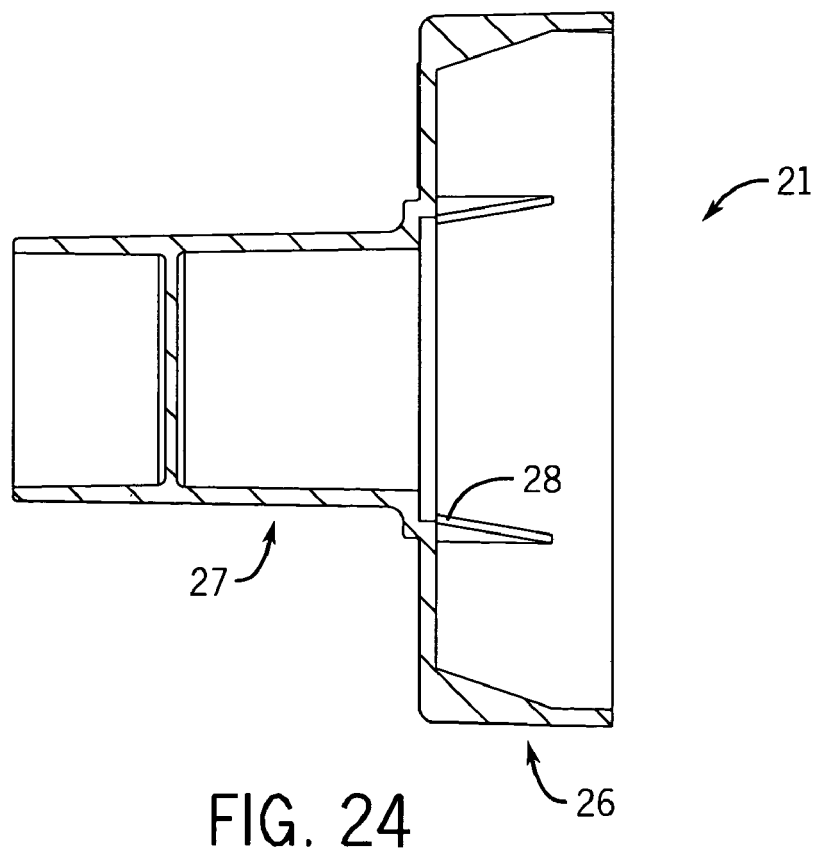
FIG. 24 is a crossectional view, taken along line 24-24 of FIG. 21, of the body bottom.
Figure 25:
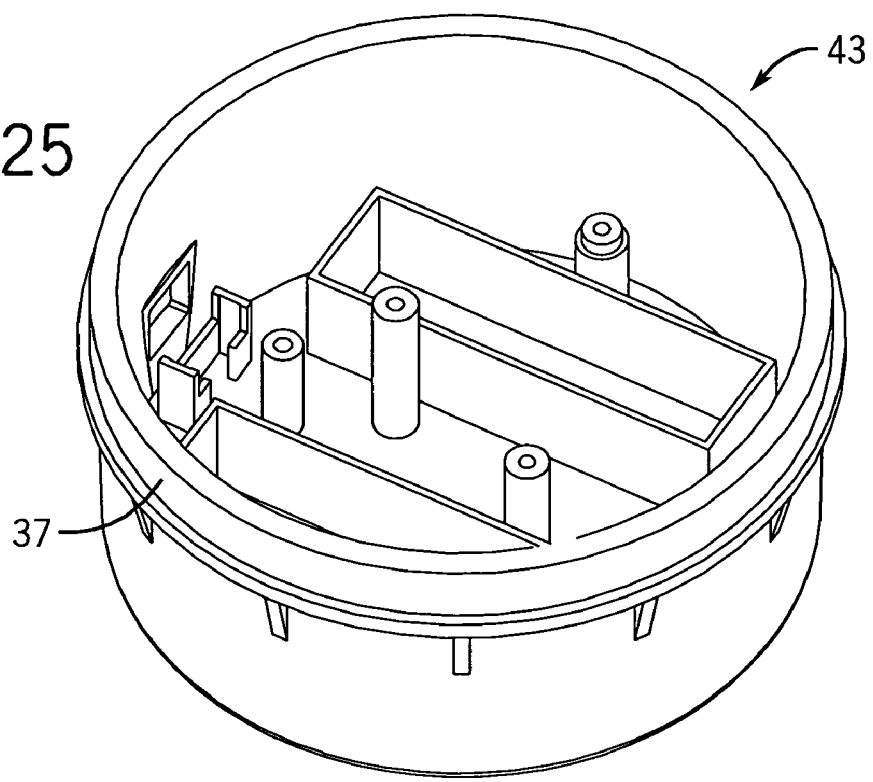
FIG. 25 is a perspective view of an embodiment of the housing bottom of the decoy.

FIG. 9 is a schematic diagram of the preferred embodiment of the electrical power and control system of the decoy 10. The circuitry comprises the motor 47 connected in series with switch 49 and the battery power supply 51 FIGS. 4-6 show a preferred embodiment of quiver arm 54 used with the decoy 10. The quiver arm 54 is preferably constructed of a wire or flexible rod formed of a metallic material such as ABS. The wire 54 has a predetermined diameter and length. The wire 54 has pair of curves 65 a and b which form a predetermined configuration, preferably "S" shaped. Referring also to FIGS. 7 and 8, the bottom, proximal end has the connection loop 66. The wire 54 as a predetermined distance "x" from the proximal end to the top, distal end 67. This arm 54 construction and arrangement, when attached to the housing 19, and actuated, will flex and move in a predetermined quiver motion.

FIGS. 1 and 2 show an example embodiment of the decoy member or element 13. It has an elongated flexible body of a predetermined length and width, and having an open, substantially circular bottom of a predetermined diameter. The body length and width and the opening diameter are functions of the dimensions of the quiver arm 54 length (distance "x") and curvature, and housing 39 diameter. The decoy element 13 body is constructed to appear similar to, at least from a distance, a small animal, preferably a prey species of the target predator. Examples of element designs include rabbits, including but not limited to jack rabbits and cotton-tails, birds such as woodpeckers, squirrels such as red squirrels, rodents, and the like. The outer surface of the decoy element 13 preferably has a predetermined color or set of colors, markings and surface area embellishments such as fur, which are representative of the prey species being imitated. Alternatively, the surface may have a generalized small animal color and/or texture. The flexible cover 13 is placed over the wire 54 whereby the bottom end is fitted over the housing 39. In a preferred mode, the cover 13 completely covers the housing 39. During use, movement of the decoy 13 by the actuator 12 simulates, generally, the prey in a wounded or otherwise distressed condition.

A second and alternative embodiment of the base 111 is shown in FIGS. 37-40. The base 111 is also preferably a two (2) part assembly. However, it is not elongated. The base 111 includes, as its first assembly part, the housing 19 of the first base embodiment 111 shown and described above, and preferably comprising all or substantially all of the structural and functional features of the prior base. In place of the elongated stake member 20, the second assembly part is a low profile foot 120. The housing 19 and foot 120 are connectable and separable as described in detail below. Alternatively, the housing and foot may be permanently connected to each other and may even be constructed as a unitary structure.

During use, and as shown, the foot 120 is placed on the ground or other surface and the housing 19 is connected to the top of the foot 120. The foot 120 has a low profile, generally frusto-conical configuration with a predetermined height, base or bottom diameter, and a top diameter. The actual dimensions may be varied consistent with the basic teachings of the invention. The foot 120 is preferably constructed of a rigid plastic material such as ABS. The foot 120 top end 132 is constructed and configured to releasably mate to the bottom member 27 of the housing 19. The bottom end 133 of the foot 120 shaft has wide flat configuration for quick and simple placement on any generally flat surfaces. It is also useful for deployment on surfaces which are difficult to penetrate by a stake, such has hard ground, frozen ground, ice, rock, gravel or aggregate, or the like. It may also be useful for very soft surfaces where it would be difficult to stabilize a stake such as sand. The first function of the foot of this alternative base embodiment is to maintain the decoy 10 in a stable, upright position during use. The second function of the foot 120 is to elevate the other members of the decoy 10 a predetermined smaller distance above the ground for optimum ease of deployment, stability, and to optimize its particular motion as described further below. The foot 120 permits faster movement for position adjustment, transportation or storage purposes. And, it provides a low profile for optimized quiver motion.

An embodiment of the foot 120 includes the bottom and top members 121 and 122 which form a hollow interior 130. The foot 120 may be filled with ballast rocks, sand, gravel, a liquid such as water, or the like to increase the weight of the foot 120 to provided added stability during actuation. Alternatively, the foot 120 may be constructed of a solid material of sufficient weight for stability. As a further alternative, the foot may be a unitary structure with other means for adding and removing ballast, such as an aperture or port disposed on the top, bottom or side of the foot.

Figure 41:
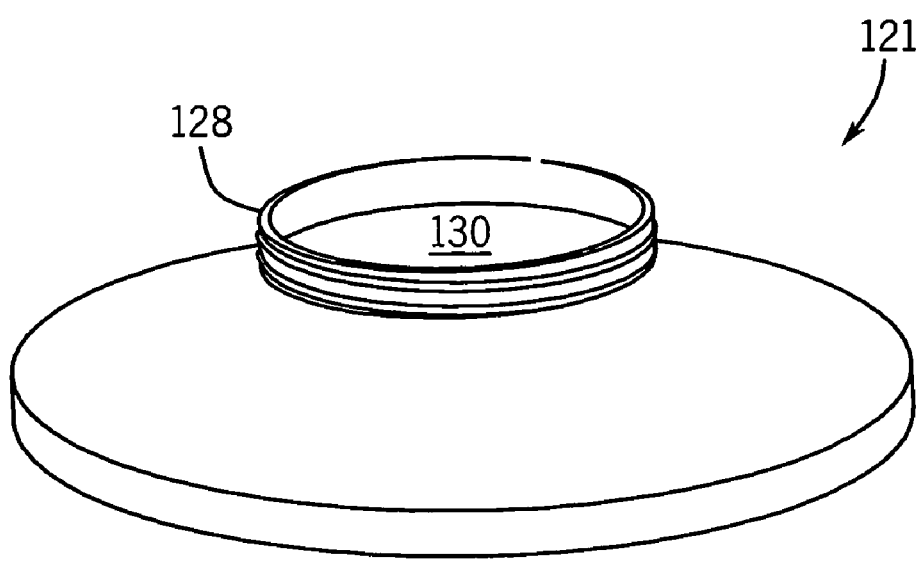
FIG. 41 is a perspective of an embodiment of a bottom member of the platform embodiment shown in FIGS. 37-40.
Figure 42:
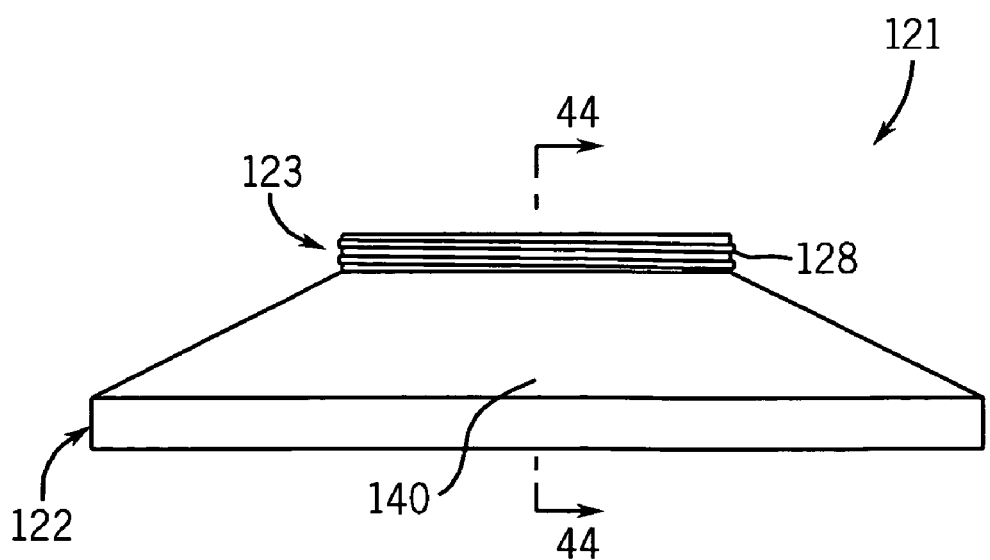
FIG. 42 is a side, elevation view of the bottom member.
Figure 43:
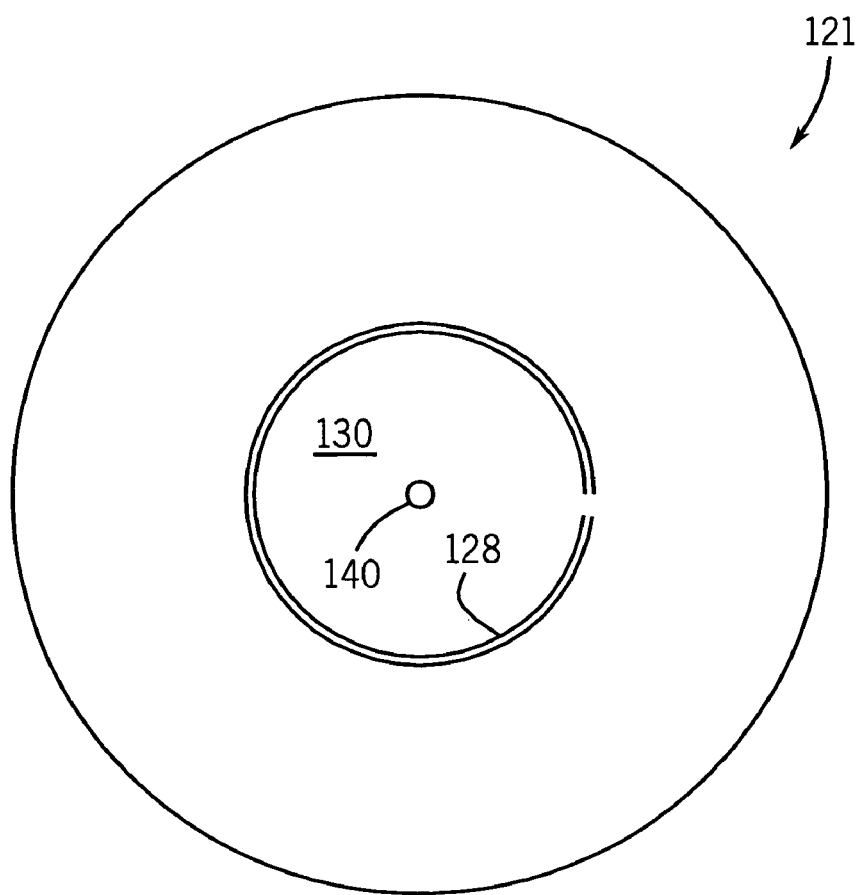
FIG. 43 is a top, plan view of the bottom member.
Figure 44:
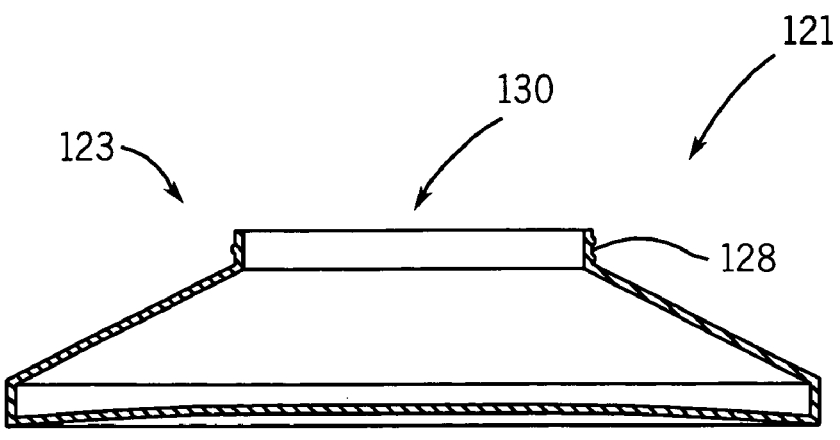
FIG. 44 is a crossectional view of the bottom member, taken along line 44-44 of FIG. 42.

Referring also to FIGS. 41-43, the bottom member 121 is constructed of a rigid material such as ABS. The bottom member 121 has a frustoconical configuration including a wide, circular bottom area 122 which tapers to a flat, circular top area 123 of predetermined diameter which is smaller than that of the bottom area 122. The center, longitudinal axis 140 of the member 121 (and foot 120) is shown in FIGS. 42 and 43. The bottom area 122 is shown to have an upwardly domed or concave surface. A connecting lip 128 is disposed at the top periphery.

Figure 46:
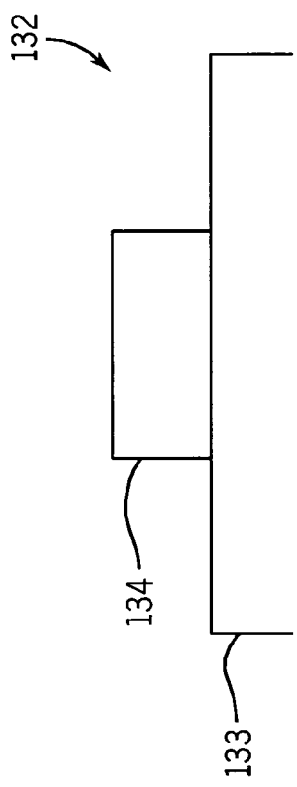
FIG. 46 is a side, elevation view of the top member.
Figure 47:
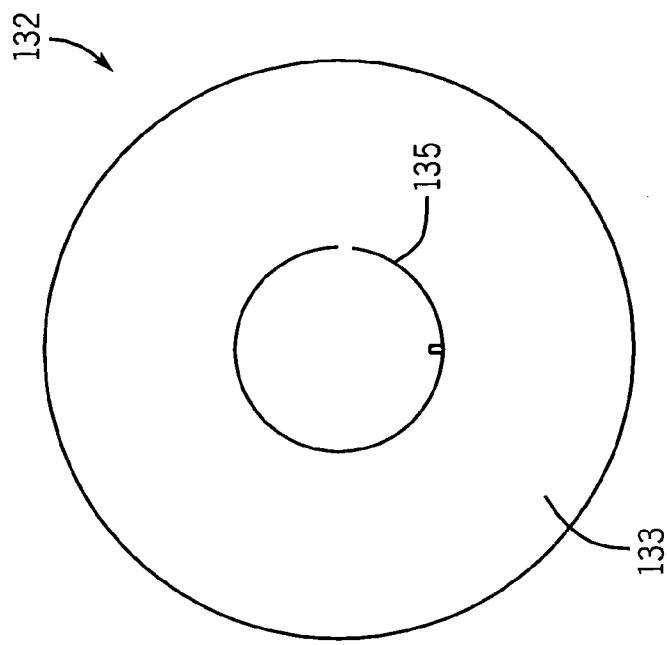
FIG. 47 is a top, plan view of the top member.
Figure 45:
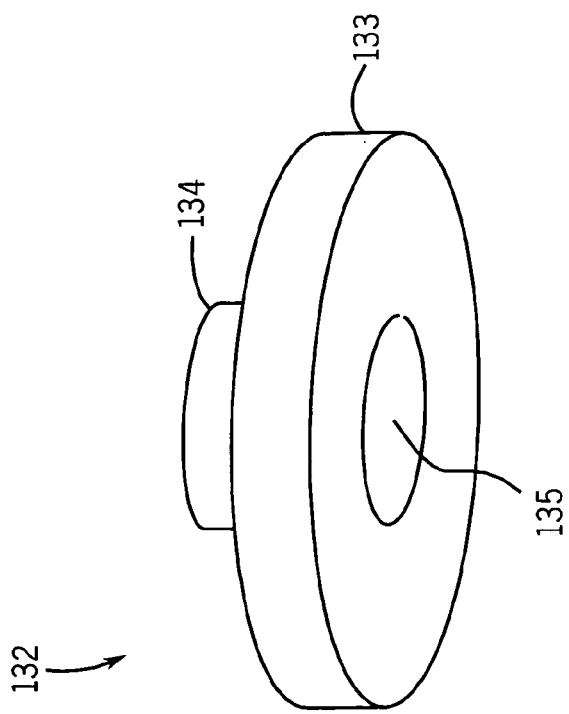
FIG. 45 is a perspective view of an embodiment of a top member of the platform embodiment shown in FIGS. 37-40.

Turning next to FIGS. 45-47, the foot top member 132 is preferably constructed of the same material as that of the bottom member 121. In use, the top member 132 is connected to the top of the bottom member 121 and defines the top of the interior space 130. The top member 132 has disc shaped top portion 133 and a cylindrical bottom member 134 with a top central aperture 135. The aperture 135 has a predetermined diameter which is slightly larger than the outside diameter of the connector 27 of base 19 and a predetermined depth, whereby the connector 27 may be friction fitted into the aperture 130 to easily, reliably, quickly and securely connect the housing 19 to the foot 120 for use, yet at the same time permit easy and fast disconnection after use. The bottom of the disc portion 133 preferably has a mating lip disposed at its periphery which has a complementary structure to that of the mating lip 128 to securely connect the top member 132 to the bottom member 121 after appropriate weighting. Examples of lip configurations include screw connections, snap connections and the like. Although the this base embodiment is described and shown for placement on the ground or other surface, it is within the purview of the invention that the ballasted base may be placed on an elevated surface such as a table, post, rock, plant part, or the like so that it is higher off the ground.

Returning now to FIGS. 1-3, the decoy 10 apparatus of the invention is suitable for use, depending of course upon applicable laws and regulations, by farmers, ranchers, aqua-culturists, private or public conservationists, and park rangers to capture or kill pest predators such as coyotes, wild dogs, and the like. The decoy 10 may also be used by sportsmen in hunting. A preferred embodiment of the method of using the apparatus 10 involves the user attaching the base 11 to the ground or other surface in a predetermined location such as a field, woods, or the like. Attachment may be made by insertion into the ground or placement on top of the ground. During set up, the actuator 12 and the decoy member 13 may be attached to the base 11. Alternatively, the actuator 12 with or without the decoy member 13 may be separated from the base 11. After attachment of the base 11 to the ground, the actuator 12 is connected to the base 11 if it is not already connected. Similarly, the decoy member 13 is connected to the actuator 12 if it is not already so connected. With the actuator 12 and decoy member 13 in place and connected to the base 11, the user then turns on and actuator 12. The actuator 12 generates a movement that in turn causes the connected decoy member 13 to undergo a motion that in a preferred embodiment simultaneously has a quivering and shaking motion. This motion lures predators to the vicinity of the decoy 10. This permits the user to trap or otherwise capture the animal. Alternatively, the animal may be eradicated by other means permitted by the law of the jurisdiction of use such as killing via bullet, shot, slug, arrow or the like. The decoy 10 may be used alone or in conjunction with other decoys of the same or differing types (static or moving), with live or inanimate baits or bait material, such as live, dead or artificial animals or animal parts or materials, plants or plant materials, natural or artificial scents, audible call or signal devices, or the like.

Although the decoy apparatus 10, methods and system has been described in connection with predator control and sports, other uses and applications are also within the purview of the invention.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An apparatus, comprising a base for placement during use on an environmental surface, the base including a surface contact end of a predetermined dimension and a support end; and a driven decoy mechanism communicatively connected at the support end of the base, the decoy mechanism comprising an actuator and a decoy member, the actuator comprising a power supply, a switch connected to the power supply, a motor connected to the switch, an actuator housing for the power supply, switch and motor, the motor being fixedly connected to an interior surface of the housing whereby actuation of the motor causes the housing to undergo a vibratory motion, and an elongated arm connected to an exterior surface of the housing at a top end thereof, the decoy member being connected to the arm.

2. The apparatus of claim 1, wherein the vibratory motion is a quiver motion having random longitudinal, radial and lateral movement components.

3. The apparatus of 1, wherein the actuator further comprises a flywheel weight connected and arranged to be rotated by the motor within the housing, and wherein the flywheel weight is connected off-center with respect to a central axis of the housing.

4. The apparatus of claim 1, wherein the actuator housing has a base connection assembly extending an adjustable distance from its exterior surface at a bottom end thereof and pivotally contacting the base.

5. The apparatus of claim 4, wherein the actuator further comprises a flywheel weight connected and arranged to be rotated by the motor within the housing, and wherein the flywheel weight is connected off-center with respect to a central axis of the housing, and whereby the vibratory motion of the actuator pivotally connected to the base yields a quiver motion to the decoy mechanism having random longitudinal, radial and lateral movement components.

6. The apparatus of claim 1, wherein the actuator arm is flexible and wherein the decoy member is a flexible and has a cover configuration that is placed over the flexible arm.

7. The apparatus of claim 6, wherein the arm is a wire structure having a predetermined length and a predetermined curved configuration.

8. The apparatus of claim 7, wherein the predetermined curved configuration is an "S" shape.

9. The apparatus of claim 6, wherein the decoy element cover is constructed and arranged to simulate a small mammal.

10. The apparatus of claim 6, wherein the arm is a wire structure having a predetermined length, wherein the predetermined configuration is an "S" shape, and wherein the decoy element cover is constructed and arranged to simulate a small animal, whereby driving of the actuator yields a quiver motion to the decoy mechanism having random longitudinal, radial and lateral movement components, which simulates a small animal in distress which is adapted to attract predatory larger animals for decoy purposes.

11. The apparatus of claim 1, wherein the base has a predetermined longitudinal length from contact end to support end.

12. The apparatus of claim 1, wherein the base has a bottom for contact with the environment and a top for connection with the decoy mechanism.

13. The apparatus of claim 1, wherein the base comprises a housing having a hollow interior, the housing having an inlet/outlet for adding and removing ballast such as water, sand, or gravel.

14. The apparatus of claim 1, wherein the decoy mechanism is pivotally connected to the base.

15. The apparatus of claim 14, wherein the decoy mechanism generates vibrations, whereby the pivotally connected decoy mechanism undergoes random longitudinal, radial and lateral movement components with respect to the base.

16. A decoy apparatus, comprising a support base for placement during use on an environmental surface, the base including a downwardly disposed surface contact end of a predetermined lateral dimension and an upwardly disposed support end of a predetermined lateral dimension which is less than that of the contact end; and a driven decoy mechanism pivotally connected to the support end of the base, the decoy mechanism including an actuator and a decoy member, the actuator comprising a power supply, a switch connected to the power supply, a motor connected to the switch, an actuator housing for the power supply, switch and motor, the motor being fixedly connected to an interior surface of the housing whereby actuation of the motor causes the housing to undergo a vibratory motion, and an elongated arm connected to an exterior surface of the housing at a top end thereof, the decoy member being connected to the arm.

17. A motion-type predator decoy apparatus for attracting coyotes, wild dogs and other pest or nuisance predators for use in ranching, farming, recreation land management, public safety and sporting fields, comprising:
   a support base for placement during use on an environmental surface, the base including a downwardly disposed surface contact end of a predetermined lateral dimension and an upwardly disposed support end of a predetermined lateral dimension; and
   a driven decoy mechanism connected to the support end of the base, the decoy mechanism including:
      an actuator which comprises:
         a. a power supply;
         b. a switch connected to the power supply;
         c. a motor connected to the switch;
         d. an elongated arm, the arm being connected to the decoy member, and
         e. an actuator housing for the power supply, switch and motor, the motor being fixedly connected to an interior surface of the housing whereby actuation of the motor causes the housing to undergo a vibratory motion, and the arm being connected to an exterior surface of the housing at a top end thereof,
      a decoy member
whereby the actuator generates vibrations and the decoy mechanism undergoes random longitudinal, radial and lateral movement components with respect to the base.

18. An apparatus, comprising a base for placement during use on an environmental surface, the base including a surface contact end of a predetermined dimension and a support end; and a driven decoy mechanism connected to the support end of the base, the decoy mechanism comprising an actuator and a decoy member, the actuator comprising a power supply, a switch connected to the power supply, a motor connected to the switch, an elongated arm extending from the base and connected to the decoy member, wherein the actuator arm is flexible and wherein the decoy member is a flexible and has a cover configuration that is placed over the flexible arm, and wherein the arm is a wire structure having a predetermined length and a predetermined curved configuration.

19. An apparatus, comprising a base for placement during use on an environmental surface, the base including a surface contact end of a predetermined dimension and a support end; and a driven decoy mechanism connected to the support end of the base, the decoy mechanism comprising an actuator and a decoy member, the actuator comprising a power supply, a switch connected to the power supply, a motor connected to the switch, an elongated arm extending from the base and connected to the decoy member, wherein the actuator arm is flexible and wherein the decoy member is a flexible and has a cover configuration that is placed over the flexible arm, and wherein the arm is a wire structure having a predetermined length, wherein the predetermined configuration is an "S" shape, and wherein the decoy element cover is constructed and arranged to simulate a small animal, whereby driving of the actuator yields a quiver motion to the decoy mechanism having random longitudinal, radial and lateral movement components, which simulates a small animal in distress which is adapted to attract predatory larger animals for decoy purposes.

* * * * *